United States Patent [19]

Roberts et al.

[11] 3,954,280

[45] May 4, 1976

[54] CHILD AUTO RESTRAINT HARNESS

[76] Inventors: Verne L. Roberts, 4131 Cobblestone Place; James H. McElhaney, 3411 Cambridge Drive, both of Durham, N.C. 27707

[22] Filed: Oct. 15, 1974

[21] Appl. No.: 514,945

[52] U.S. Cl. .................. 280/744; 297/389
[51] Int. Cl.² .......................... B60R 21/10
[58] Field of Search ............. 280/150 SB; 297/385, 297/389

[56] References Cited
UNITED STATES PATENTS

| | | | |
|---|---|---|---|
| 2,825,581 | 3/1958 | Knight | 280/150 SB |
| 3,512,830 | 5/1970 | Norman | 297/385 |
| D204,190 | 3/1966 | Levy | 297/385 X |

*Primary Examiner*—Robert R. Song
*Attorney, Agent, or Firm*—Harness, Dickey & Pierce

[57] ABSTRACT

A harness for restraining occupants, particularly children, in a vehicle. The harness includes an elongated rigid strap plate having an anchor strap secured thereto with the opposite end of the anchor strap secured to means for transferring impact energy to the frame of the vehicle. Shoulder straps are secured to the strap plate on opposite sides of the anchor strap. Waist and crotch straps are provided and a buckle releasably secure the waist, crotch and shoulder straps in front of the child.

26 Claims, 8 Drawing Figures

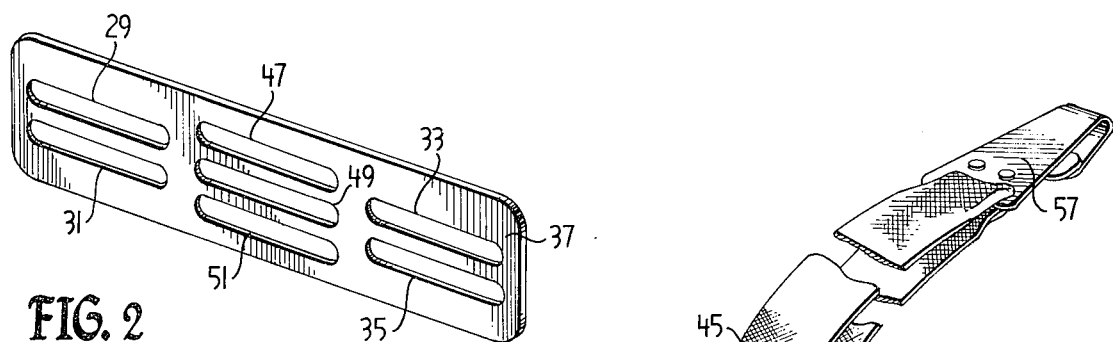
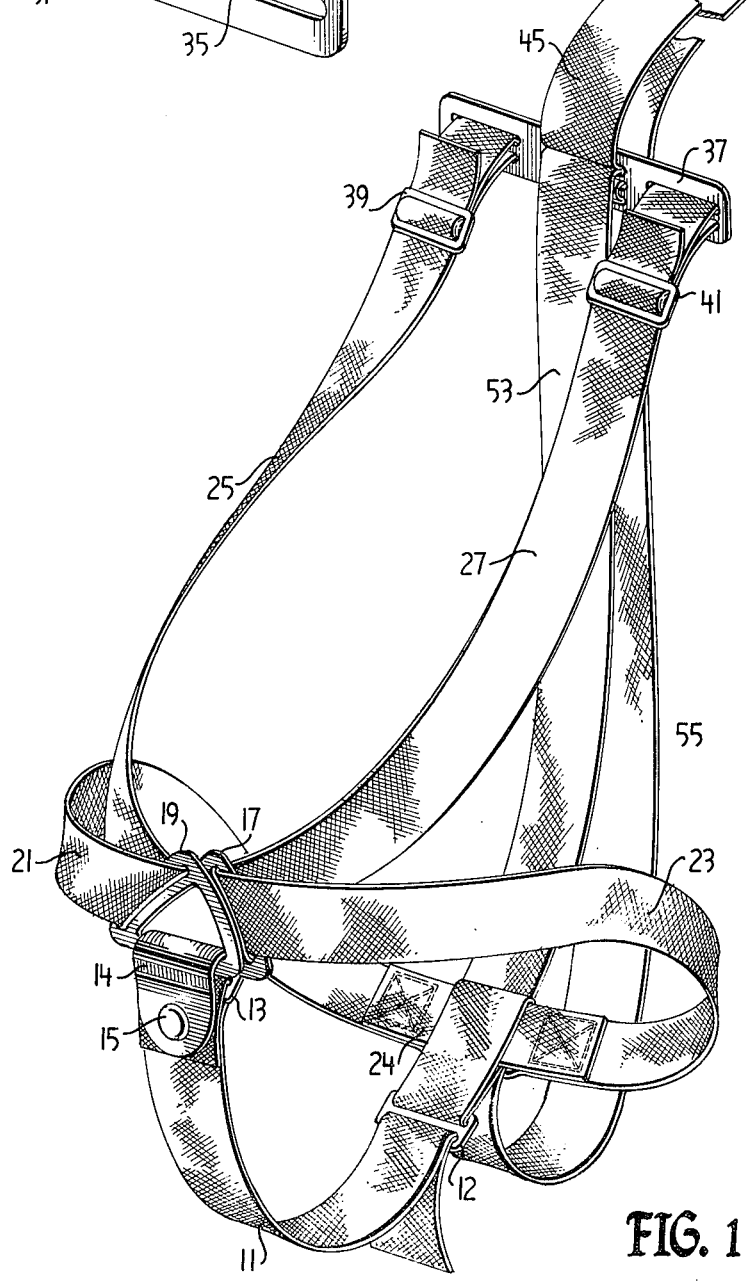

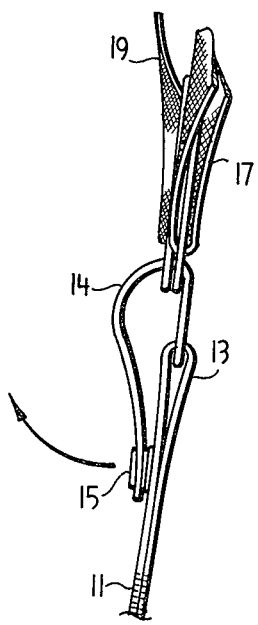
FIG. 5
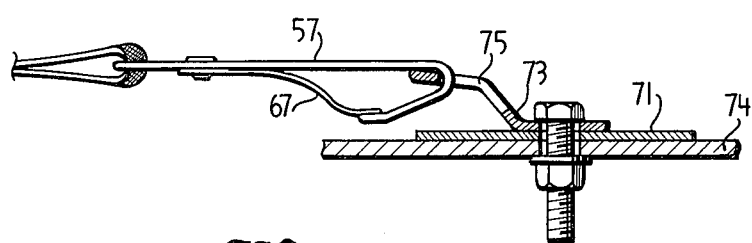
FIG. 6
FIG. 7 [PRIOR ART]
FIG. 8

CHILD AUTO RESTRAINT HARNESS

This application relates broadly to child auto safety devices and more specifically to an auto restraint harness.

Auto restraint harnesses for children have been available for a number of years, each having various structural restraining systems designed to protect the child upon impact or sudden stops. The available harnesses of which I am aware have one major disadvantage relative to the protection of the child. This disadvantage is due to the fact that the known harness arrangements permit the strap to "pinch in" on the child's body under impact, tending to squeeze the body in either the thoracic or pelvic area.

Additional problems present in the available harnesses result from the fact that the force of the impact is primarily transferred to the abdomen of the child. Medical authorities agree that not even the abdomen of adults should be enclosed by safety belts, let alone that of children. They further agree that both the thoracic and pelvic regions are not well developed in children and should be avoided as restraint locations.

In order to overcome some of these problems there is now available a harness including a shield which covers the child's body in the forward area. However, these restraint devices do not, in fact, accomplish wide distribution of impact forces onto the shield. Since the shield is flexible and is connected to flexible straps, the harness will still "collapse" under impact and squeeze the body. This action can be compared to the performance of a cargo net. As the cargo net is loaded, it encloses the cargo and encircles and squeezes it.

Accordingly, it is an object of this invention to provide a child harness restraint system which transfers the force of the impact primarily to the frame of the automobile.

It is another object of this invention to insure that the force of the impact which is transferred to the child shall be primarily at the child's shoulder.

A further object of the invention is to provide a child harness restraint system which maintains a spacing between the flexible straps so as to avoid a squeezing of the child's body.

Yet another object of the invention is to provide adjustable means with the above identified harness so that it may be used by children of different sizes.

These and other objects of the invention will become apparent from the following description when takin in conjunction with the drawings wherein:

FIG. 1 is a perspective view of the harness assembly of the present invention prior to installation in the automobile;

FIG. 2 is a plan view of the strap plate used to maintain separation of the shoulder straps;

FIG. 5 is a partial side view of the clasping arrangement used in the present invention;

FIG. 6 is a partial sectional view of the anchor used with the harness system of FIG. 4;

FIG. 7 is a perspective view illustrating the movement of the shoulder straps in the prior art harness system; and FIG. 8 is an illustration of the non-movement of the shoulder straps in the system of the present invention.

Figure 3:
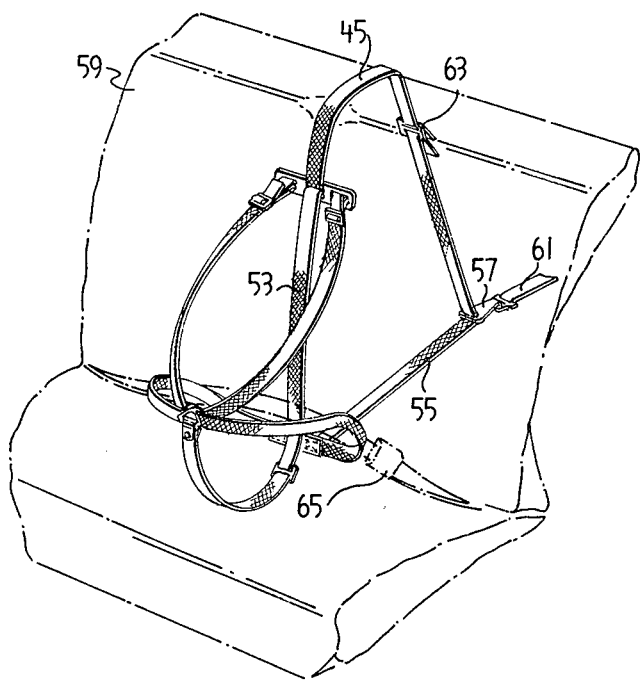
FIG. 3 is a perspective view of the harness system of the present invention mounted on the front seat of an automobile.

Broadly speaking, the invention comprises an elongated rigid strap plate having an anchor strap secured thereto with the opposite end of the anchor strap secured to means for transferring impact energy to the frame of the car. Shoulder straps are secured to the strap plate on opposite sides of the anchor strap. Waist and crotch straps are provided and a buckle releasably secure the waist, crotch and shoulder straps in front of the child.

Turning now more specifically to the drawings, there is shown a harness system having a crotch strap 11 terminating at its outer end in a loop 13. This loop is secured within a slot of a plate 14 which includes a snap buckle 15. The snap buckle passes through two triangular metal clasps 17 and 19 so as to provide a common locking and release point for the harness system. Details of the snap buckle and clasps are more clearly shown in FIG. 5.

In the embodiment shown, a single strap functions both as dual shoulder straps and dual waist straps. Lower sections 21 and 23 form the waist straps while upper sections 25 and 27 form the shoulder straps. Strap 25 is threaded through the slots 29 and 31 of strap plate 37 while the outer end of shoulder strap 27 is threaded through slots 33 and 35 at the opposite end of plate 37. The end of the straps are secured by standard strap adjusters 39 and 41.

As can be seen, these straps pass through slots in triangular clasps 17 and 19 which have openings to accept plate 14. This allows for easy securing of the harness about the child and quick release of the buckling system.

A flexible panel 24 is secured at either end thereof to the central portion of the interior of the waist belt section. The free end of crotch strap 11 is passed between the panel 24 and the waist belt and secured by means of strap adjuster 12.

An anchor strap passes through slots 47, 49, and 51 of plate 37 with the upper section 45 being threaded through a slot in spring clasp 57 to be described in detail subsequently.

The forward section 53 of the anchor strap passes between the waist belt and panel 24 with the rear section 55 returning upwardly to the strap plate. The entire anchor strap is in one piece and is adjusted and secured by means of a belt adjuster 63 shown in FIGS. 3 and 4.

Separate straps could be used for each section of the waist and shoulder straps. In such a case, they could be sewn or secured together adjacent panel 24.

FIG. 3 illustrates the arrangement of the harness when it is secured to a front car seat 59. In this position, the lower section 53 of the anchor strap passes under the car seat belt 65. The spring clip 57 is secured to the male lap belt tongue of the rear seat in order to transfer impact energy to the frame of the car. This is accomplished by passing the rear section 55 of the anchor belt through the crack between the horizontal and vertical sections of the front seat.

Figure 4:
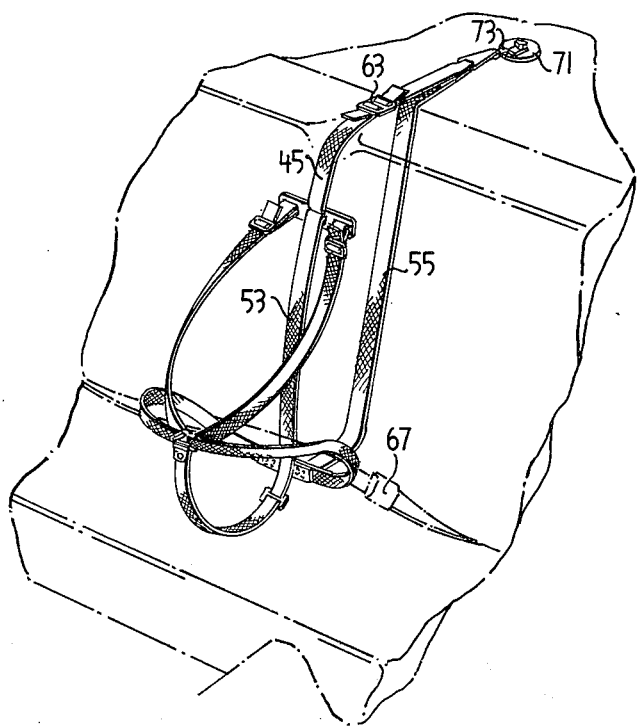
FIG. 4 is a perspective view of the harness system mounted on the back seat of an automobile.

FIG. 4 illustrates the method of mounting the harness in the back seat of the automobile. Again, the anchor strap is passed about the rear seat belt 67 and carries upward along the back of the seat. In order to secure the anchor strap so as to transfer impact energy to the frame of the car, anchor plate 71 and anchor 73 are secured by means of a nut and bolt to the rear shelf 74 of the automobile. Anchor 73 has an upwardly extending arm with a slot 75 therein which accepts the spring clasp when spring finger 67 is depressed.

It will be obvious that the anchor plate and anchor of FIGS. 4 and 6 could also be used when the harness is mounted in the front seat.

FIG. 7 illustrates the prior art shoulder harnesses which are now in use. Most of these harnesses have a single attachment point at the back of the child's back. When impact occurs and the child is thrown forward, the flexible straps tend to move in the direction shown by the arrows, thus causing the adverse squeezing effect discussed above.

FIG. 8 illustrates the effectiveness of strap plate 37 in maintaining the shoulder straps at a fixed distance so as to prevent any squeezing effects on impact. Further, since strap plate 37 is adjustable in a vertical direction, it can be properly positioned for the height of the particular child involved.

It will be obvious from the above description that a child restraint harness has been provided which provides maximum transfer of the energy of impact to the frame of the automobile. Further, the particular restraining system used assures that the portion of the force of the impact which is absorbed by the child occurs at the most desirable points, specifically, the shoulder area.

The above description and drawings are illustrative only since the various components of the sysem could be modified without departing from the invention. Accordingly, the invention is to be limited only by the scope of the following claims.

What is claimed is:

1. A restraint harness for use by a child in a vehicle seat having a safety belt comprising a crotch strap terminating at one end forward of said child and extending underneath said child, a pair of waist straps extending about said child, the other end of said crotch strap being fixed to said waist straps, a rigid strap plate adjacent the vertical section of said seat behind the shoulders of said child, a plurality of slots in said strap plate of a size to accept said straps, an anchor strap affixed to said strap plate by being threaded through selected ones of said slots in said strap plate, said anchor strap passing over said waist straps for fixing said waist straps to said anchor strap and around said safety belt for fixing said anchor strap to said safety belt and between the horizontal and vertical sections of said vehicle seat, a clasp secured to said anchor strap rearwardly of said automobile seat, means for securing said clasp to the associated vehicle, shoulder straps affixed to said anchor plate by being threaded through said strap plate on either side of said anchor strap and buckle means for releasably securing said waist strap, said crotch strap, and said shoulder straps in front of said child.

2. The harness of claim 1 further comprising:
means for adjusting the vertical position of said strap plate; and
means for adjusting the length of said shoulder straps.

3. The harness of claim 1 wherein said seat belt is secured over said anchor strap.

4. The harness of claim 1 wherein said means for securing said clasp to the vehicle comprises a rearward seat belt for securing said clasp thereto.

5. The harness of claim 1 wherein said means for securing said clasp to the vehicle comprises an anchor plate secured to a portion of the vehicle and an anchor secured to said anchor plate adapted to receive said clasp.

6. A restraint harness for use by a child in a vehicle seat including a seat belt comprising a rigid strap plate adapted to be positioned in direct engagement with the back of the child, an anchor strap secured to said strap plate and positioning said strap plate between the shoulders of said child and the vertical section of said seat, shoulder straps secured to said strap plate, a waist strap, a crotch strap, buckle means for releasably securing said waist strap, said shoulder straps and said crotch strap in front of said child, and means for securing said anchor strap to the vehicle.

7. The harness of claim 6 further comprising: means for securing said seat belt about said anchor strap.

8. A restraint harness, particularly adapted to be used for restraining a child in a vehicle, comprising a rigid member adapted to be positioned contiguous to the shoulders of the wearer and in direct engagement with the back of the wearer, a first shoulder strap having a first portion affixed to said rigid member and adapted to extend over one shoulder of the wearer, a second shoulder strap having a first portion affixed to said rigid member and adapted to extend over the other shoulder of the wearer, said first portions of said shoulder straps being affixed to said rigid member at points spaced from each other for preventing movement of said shoulder straps together upon impact, means for restraining other portions of said shoulder straps in fixed relation to the body of the wearer for restraining said wearer, and means for affixing said harness to the associated vehicle.

9. A restraint harness as set forth in claim 8 wherein the means for affixing the harness to the associated vehicle comprises means for affording a detachable connection to a seat belt of the vehicle.

10. A restraint harness as set forth in claim 8 wherein the means for affixing the harness to the associated vehicle includes means for affixing said rigid member to the vehicle.

11. A restraint harness as set forth in claim 10 wherein the means for affixing the rigid member to the vehicle includes means affixed to said rigid member and affording a detachable connection to a seat belt of the vehicle.

12. A restraint harness as set forth in claim 11 wherein the means connected to the rigid member and affording the detachable connection to the vehicle seat belt comprises an anchor strap.

13. A restraint harness as set forth in claim 12 wherein the anchor strap carries means for affording a second detachable connection to the vehicle.

14. A restraint harness as set forth in claim 13 wherein the means for affording the second detachable connection to the vehicle comprises means adapted to be connected to another seat belt of the vehicle.

15. A restraint harness as set forth in claim 13 wherein the means for providing the other connection to the vehicle comprises means adapted to afford a detachable connection to a fixed anchor of the vehicle.

16. A restraint harness as set forth in claim 8 further including waist straps adapted to encircle the waist of the wearer.

17. A restraint harness as set forth in claim 16 wherein the waist straps are integral with respective of the shoulder straps.

18. A restraint harness as set forth in claim 17 further including adjustable buckle means carried by each of said shoulder straps and integral waist straps, said buckle means being adjustable along the length of said integral straps for adjusting the respective lengths of the shoulder and waist portions thereof.

19. A restraint harness as set forth in claim 18 further including a crotch strap and buckle means carried thereby, said crotch strap buckle means being adapted to be detachably connected to said integral strap buckle means for detachably connecting said straps to each other.

20. In a child restraining harness for use in a vehicle having a seat belt, said harness having straps adapted to engage and restrain the body of a wearer, the improvement comprising means for detachably connecting said harness to the vehicle seat belt to affix said harness to the associated vehicle, the means for detachably connecting the harness to the vehicle seat belt comprising a strap forming a portion of said harness and carrying clasp means adapted to be detachably connected to the vehicle seat belt.

21. A restraint harness, particularly adapted to be used for restraining a child in a vehicle, comprising a first shoulder strap adapted to extend over one shoulder of a wearer, a second shoulder strap adapted to extend over the other shoulder of the wearer, a first buckle member carried by said first shoulder strap, a second buckle member carried by said second shoulder strap, a crotch strap adapted to pass across the crotch of the wearer, a third buckle member affixed to said crotch strap, said first, second and third buckle members being cooperable to affix said straps together, and means for affixing said straps to the associated vehicle.

22. A restraint harness as set forth in claim 21 wherein two of the buckle members comprise means defining openings, the third buckle member comprising a clasp adapted to extend through said openings for affixing said buckle members together.

23. A restraint harness as set forth in claim 21 further including a first waist strap affixed to said first buckle member and a second waist strap affixed to said second buckle member, said waist straps being adapted to encircle the waist of a wearer.

24. A restraint harness as set forth in claim 23 wherein the first and second buckle members are adjustably connected to the respective shoulder and waist straps for adjusting the length thereof.

25. A restraint harness as set forth in claim 24 wherein two of the buckle members comprise means defining openings, the third buckle member comprising a clasp adapted to extend through said openings for affixing said buckle members together.

26. In a child restraining harness for use in a vehicle having two seat belts, said harness having straps adapted to engage and restrain the body of a wearer, the improvement comprising means for detachably connecting said harness to the vehicle seat belts to affix said harness to the associated vehicle, the means for affording the detachable connection of the harness to the first of the vehicle seat belts comprising means on said harness adapted to be interlocked with the first vehicle seat belt, and means for providing a detachable connection between said harness and the other vehicle seat belt.

* * * * *